(12) United States Patent
Watanabe et al.

(10) Patent No.: US 10,378,378 B2
(45) Date of Patent: Aug. 13, 2019

(54) SHIELD MEMBER AND JET ENGINE USING THE SAME

(71) Applicant: IHI Corporation, Koto-ku (JP)

(72) Inventors: Fumiaki Watanabe, Tokyo (JP); Akane Ohbo, Tokyo (JP); Hiroyuki Yagi, Tokyo (JP); Tomotake Ogawa, Tokyo (JP); Tsuyoshi Takemoto, Tokyo (JP)

(73) Assignee: IHI Corporation, Koto-ku (JP)

( * ) Notice: Subject to any disclaimer, the term of this patent is extended or adjusted under 35 U.S.C. 154(b) by 147 days.

(21) Appl. No.: 15/623,954

(22) Filed: Jun. 15, 2017

(65) Prior Publication Data

US 2017/0284221 A1 Oct. 5, 2017

Related U.S. Application Data

(63) Continuation of application No. PCT/JP2015/073455, filed on Aug. 21, 2015.

(30) Foreign Application Priority Data

Apr. 7, 2015 (JP) .................................. 2015-078430

(51) Int. Cl.
*F01D 11/00* (2006.01)
*F02C 7/28* (2006.01)
(Continued)

(52) U.S. Cl.
CPC .............. *F01D 25/08* (2013.01); *C04B 35/80* (2013.01); *C04B 35/806* (2013.01); *F01D 5/147* (2013.01); *F01D 5/30* (2013.01); *F01D 11/00* (2013.01); *F01D 25/00* (2013.01); *F02C 7/28* (2013.01); *C04B 2235/3826* (2013.01); *C04B 2235/5224* (2013.01); *C04B 2235/5244* (2013.01);
(Continued)

(58) Field of Classification Search
CPC . F01D 25/08; F01D 5/30; F01D 5/147; C04B 35/806; F05D 2220/323
See application file for complete search history.

(56) References Cited

U.S. PATENT DOCUMENTS

| | | | |
|---|---|---|---|
| 2,613,910 A | 10/1952 | Stalker | |
| 5,785,499 A | 7/1998 | Houston et al. | |

(Continued)

FOREIGN PATENT DOCUMENTS

| | | | |
|---|---|---|---|
| CN | 1657807 A | 8/2005 | |
| CN | 1749531 A | 3/2006 | |

(Continued)

OTHER PUBLICATIONS

Combined Office Action and Search Report dated Jun. 8, 2018, in Russian Patent Application No. 2017134792/06 with partial English translation, 8 pages.
(Continued)

*Primary Examiner* — Hieu T Vo
*Assistant Examiner* — Arnold Castro
(74) *Attorney, Agent, or Firm* — Oblon, McClelland, Maier & Neustadt, L.L.P.

(57) ABSTRACT

A shield member is disposed over a gap between platform portions of adjacent turbine rotor blades, made from a ceramic matrix composite, and configured to shield the gap between the platform portions.

20 Claims, 13 Drawing Sheets

(51) Int. Cl.
*F01D 25/08* (2006.01)
*C04B 35/80* (2006.01)
*F01D 25/00* (2006.01)
*F01D 5/14* (2006.01)
*F01D 5/30* (2006.01)

(52) U.S. Cl.
CPC .... *F05D 2220/323* (2013.01); *F05D 2240/80* (2013.01); *F05D 2260/231* (2013.01)

(56) References Cited

U.S. PATENT DOCUMENTS

| | | | |
|---|---|---|---|
| 5,924,699 | A | 7/1999 | Airey et al. |
| 6,764,771 | B1 | 7/2004 | Heimberg et al. |
| 7,121,800 | B2 | 10/2006 | Beattie |
| 7,744,096 | B2 | 6/2010 | Kono |
| 8,613,599 | B2 | 12/2013 | Lake et al. |
| 2005/0179215 | A1 | 8/2005 | Kono |
| 2006/0056974 | A1 | 3/2006 | Beattie |
| 2008/0199307 | A1 | 8/2008 | Keller |
| 2013/0121810 | A1 | 5/2013 | Alquier et al. |
| 2015/0037167 | A1 | 2/2015 | Simon-Delgado et al. |
| 2015/0192027 | A1 | 7/2015 | Paige et al. |
| 2015/0292340 | A1 | 10/2015 | Kawanishi et al. |
| 2017/0254206 | A1* | 9/2017 | Schetzel ................ F01D 5/147 |
| 2017/0254207 | A1* | 9/2017 | Schetzel ................ B23P 15/04 |
| 2017/0284221 | A1* | 10/2017 | Watanabe ............... C04B 35/80 |

FOREIGN PATENT DOCUMENTS

| | | |
|---|---|---|
| CN | 103119251 A | 5/2013 |
| CN | 104411921 A | 3/2015 |
| DE | 102 56 778 A1 | 1/2004 |
| EP | 2 832 952 A1 | 2/2015 |
| FR | 2 963 382 A1 | 2/2012 |
| JP | 7-310502 | 11/1995 |
| JP | 10-196305 | 7/1998 |
| JP | 10-196309 | 7/1998 |
| JP | 11-62502 | 3/1999 |
| JP | 11-81906 | 3/1999 |
| JP | 2001-521993 | 11/2001 |
| JP | 2005-233251 | 9/2005 |
| JP | 2006-77759 | 3/2006 |
| JP | 2012-46398 | 3/2012 |
| JP | 2015-135076 | 7/2015 |
| RU | 2 486 349 C2 | 9/2008 |
| WO | WO 2014/004098 A1 | 1/2014 |
| WO | WO 2014/109246 A1 | 7/2014 |
| WO | WO 2014/150147 A1 | 9/2014 |

OTHER PUBLICATIONS

Extended European Search Report dated Apr. 5, 2018 in European Patent Application No. 15888531.9, 6 pages.
Combined Chinese Office Action and Search Report dated Jul. 31, 2018 in Chinese Patent Application No. 201580066915.5, 5 pages.
International Search Report dated Nov. 24,2015 in PCT/JP2015/073455, filed on Aug. 21, 2015 (with English Translation).
Written Opinion dated Nov. 24,2015 in PCT/JP2015/073455, filed on Aug. 21, 2015.

* cited by examiner

SHIELD MEMBER AND JET ENGINE USING THE SAME

CROSS REFERENCE TO RELATED APPLICATIONS

This application is a continuation application of International Application No. PCT/JP2015/073455, filed on Aug. 21, 2015, which claims priority to Japanese Patent Application No. 2015-078430, filed on Apr. 7, 2015, the entire contents of which are incorporated by references herein.

BACKGROUND

1. Field

The present disclosure relates to a shield member and a jet engine using the shield member, and particularly to a shield member used for a turbine rotor blade in an aircraft turbofan engine and the like and a jet engine using the shield member.

2. Description of the related art

An aircraft turbofan engine and the like include multiple turbines for extracting energy from a combustion gas. Each turbine includes multiple turbine rotor blades. Each turbine rotor blade includes an airfoil portion, a tip shroud, a platform portion and a dovetail portion. International Publication No. WO2014/109246 (Patent Literature 1) discloses a turbine rotor blade including these components.

SUMMARY

In the turbine rotor blade, for example, of a low-pressure turbine, the combustion gas flows through a space surrounded by the tip shroud and the platform portion, and the airfoil portion receives the combustion gas and converts the flow into rotational energy to transmit the rotational energy to the turbine disk. If during this process, the combustion gas enters between the platform portions of the adjacent turbine rotor blades, there is a possibility that the turbine disk is damaged because of its exposure to the heat of the combustion gas.

Meanwhile, in a high-pressure turbine, the combustion gas flows through a space surrounded by the shroud fixed to the casing and the platform portion, and the airfoil portion receives the combustion gas and converts the flow into rotational energy to transmit the rotational energy to the turbine disk. If during this process, the combustion gas enters between the platform portions of the adjacent turbine rotor blades, there is a possibility that the turbine disk is damaged because of its exposure to the heat of the combustion gas as in the case of the low-pressure turbine.

An object of the present disclosure is to provide a shield member capable of shielding gaps between platform portions of adjacent turbine rotor blades, and a jet engine using the shield member.

A shield member according to the present disclosure, disposed over a gap between platform portions of adjacent turbine rotor blades, made from a ceramic matrix composite, is configured to shield the gap between the platform portions.

In the shield member according to the present disclosure, the platform portions each include a platform portion body formed extending in a direction intersecting a longitudinal direction of a corresponding one of the turbine rotor blades, and a front skirt provided to a leading edge side of the platform portion body, and the shield member includes a shield member body formed elongated and including a first shield surface located between shank portions connected to the platform portions of the adjacent turbine rotor blades, the first shield surface configured to shield a gap between the platform portion bodies of the adjacent turbine rotor blades by coming into contact with inner surfaces of the platform portion bodies along the inner surfaces of the platform portion bodies, and a leading edge-side shield portion formed elongated and including a second shield surface located between the shank portions of the adjacent turbine rotor blades, a first end in a longitudinal direction of the leading edge-side shield portion integrally provided to a first end in a longitudinal direction of the shield member body while bent from the shield member body, the second shield surface configured to shield a gap between the front skirts of the adjacent turbine rotor blades by coming into contact with inner surfaces of the front skirts along the inner surfaces of the front skirts.

The shield member according to the present disclosure, further includes restriction portions provided at parts of both sides in the longitudinal direction of the shield member body, the restriction portions formed projecting in a width direction intersecting the longitudinal direction of the shield member body, and curving toward a back surface of the first shield surface, the restriction portions configured to restrict movement of the shield member in the width direction by coming into contact with side surfaces of the shank portions of the adjacent turbine rotor blades.

In the shield member according to the present disclosure, the platform portions each include a rear skirt provided to a trailing edge side of the corresponding platform portion body, the rear skirt includes a holding portion, provided to an inner surface of the rear skirt, for holding a second end in the longitudinal direction of the shield member body, and the shield member further includes a curving portion provided to the second end in the longitudinal direction of the shield member body, formed curving toward a back surface of the first shield surface, and configured to come into contact with the holding portions of the rear skirts of the adjacent turbine rotor blades.

In the shield member according to the present disclosure, the platform portions each include a rear skirt provided to a trailing edge side of the corresponding platform portion body, the rear skirt includes a holding portion, provided to an inner surface of the rear skirt, for holding a second end in the longitudinal direction of the shield member body, and the shield member further includes first contact portions provided to full lengths of both sides in the longitudinal direction of the shield member body, the first contact portions formed projecting in a width direction intersecting the longitudinal direction of the shield member body, and curving toward a back surface of the first shield surface, the first contact portions configured to come into contact with side surfaces of the shank portions of the adjacent turbine rotor blades, and with the holding portions of the rear skirts, and second contact portions provided to full lengths of both sides in the longitudinal direction of the leading edge-side shield portion, the second contact portions formed projecting in a width direction intersecting the longitudinal direction of the leading edge-side shield portion, and curving toward a back surface of the second shield surface, the second contact portions configured to come into contact with the side surfaces of the shank portions of the adjacent turbine rotor blades.

In the shield member according to the present disclosure, the shank portions are each formed curving corresponding to a shape of an airfoil portion of the corresponding turbine rotor blade, and the shield member body is formed curved in a plane corresponding to side surfaces of the shank portions of the adjacent turbine rotor blades.

In the shield member according to the present disclosure, the platform portions each include a platform portion body-side fitting groove provided to the inner surface of the platform portion body, and a front skirt-side fitting groove provided to the inner surface of the front skirt, the shield member body includes a shield member body-side fitting portion provided to a second end in the longitudinal direction of the shield member body, and configured to be fitted into the platform portion body-side fitting groove, and the leading edge-side shield portion includes a leading edge-side shield portion-side fitting portion provided to a second end in a longitudinal direction of the leading edge-side shield portion, and configured to be fitted into the front skirt-side fitting groove.

In the shield member according to the present disclosure, the platform portion includes a front skirt-side fitting groove provided in the inner surface of the front skirt, and the leading edge-side shield portion includes a leading edge-side shield portion-side fitting portion provided to a second end in a longitudinal direction of the leading edge-side shield portion, and configured to be fitted into the front skirt-side fitting groove.

A jet engine according to the present disclosure includes one of the shield members described above.

According to the shield member having the foregoing configuration, and the jet engine using the shield member, the shield member is disposed over the gaps between the platform portions of the adjacent turbine rotor blades, and is made from the ceramic matrix composite. Thus, the shield member is heat-resistant against the combustion gas, and is capable of shielding the turbine disk from the combustion gas which would otherwise flow into the inside of the platform portions through the gaps between the platform portions. Thereby, it is possible to inhibit damage on the turbine disk due to the combustion gas.

DESCRIPTION OF EMBODIMENTS

Using the drawings, detailed descriptions will be hereinbelow provided for the embodiments of the present disclosure.

[First Embodiment]

Figure 1:
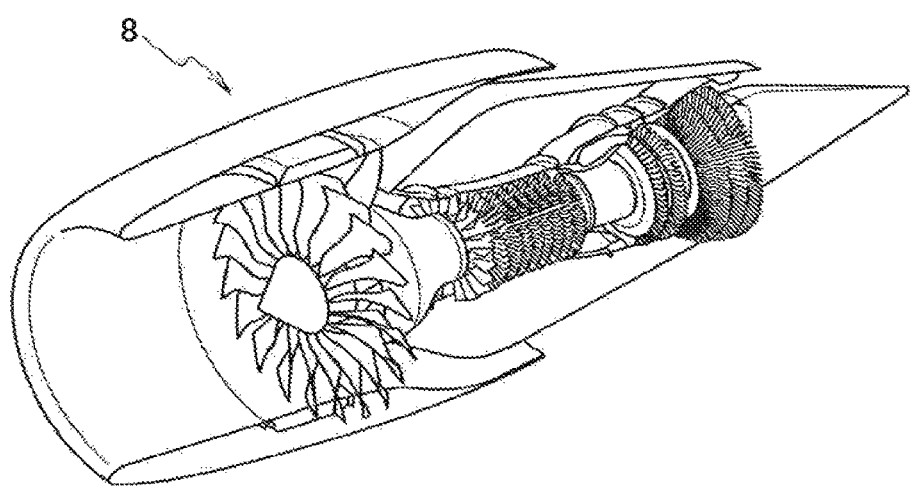
FIG. 1 is a diagram illustrating a configuration of an aircraft turbofan jet engine in a first embodiment of the present disclosure.

Using the drawings, detailed descriptions will be provided for a first embodiment of the present disclosure. To begin with, descriptions will be provided for a turbine rotor blade used in a jet engine such as an aircraft turbofan engine. FIG. 1 is a diagram illustrating a configuration of an aircraft turbofan engine 8. The aircraft turbofan engine 8 includes turbines in plural stages, such as low-pressure turbines, for extracting energy from a combustion gas which is obtained by combusting a working fluid such as air. Each turbine includes multiple turbine rotor blades arranged on the circumference of a turbine disk.

Figure 2:
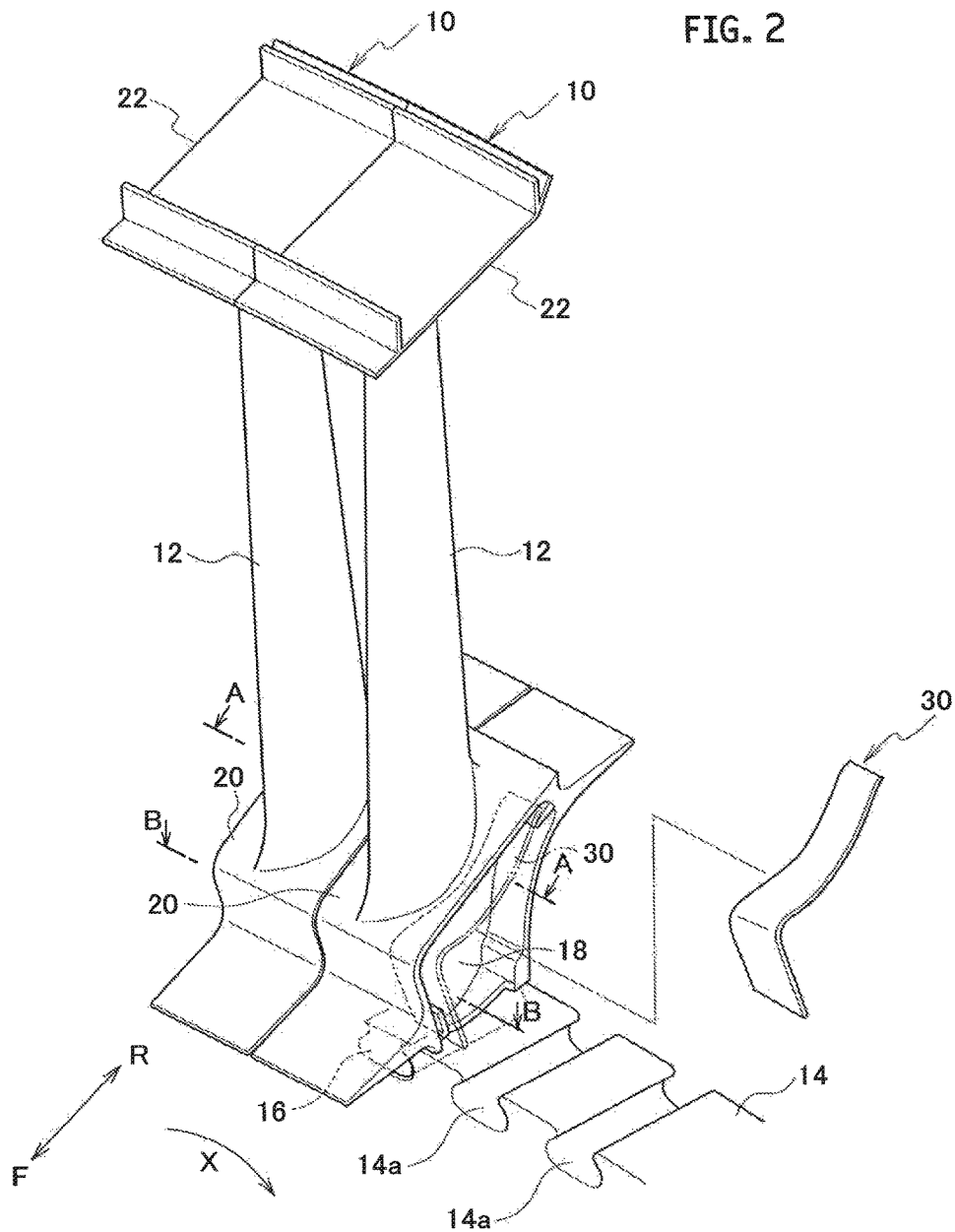
FIG. 2 is a perspective view illustrating a configuration of a turbine rotor blade in the first embodiment of the present disclosure.
Figure 3:
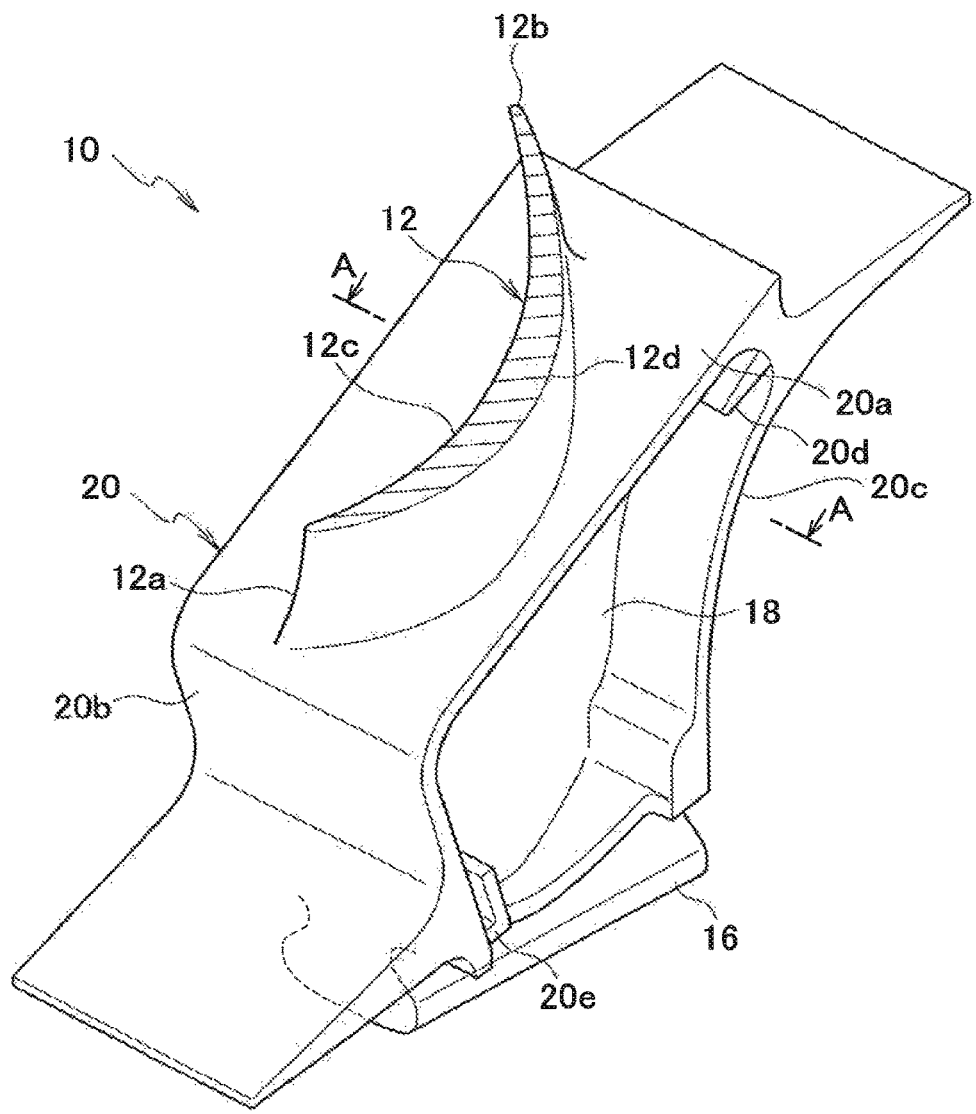
FIG. 3 is a perspective view illustrating a configuration of a main part of the turbine rotor blade in the first embodiment of the present disclosure.
Figure 4:
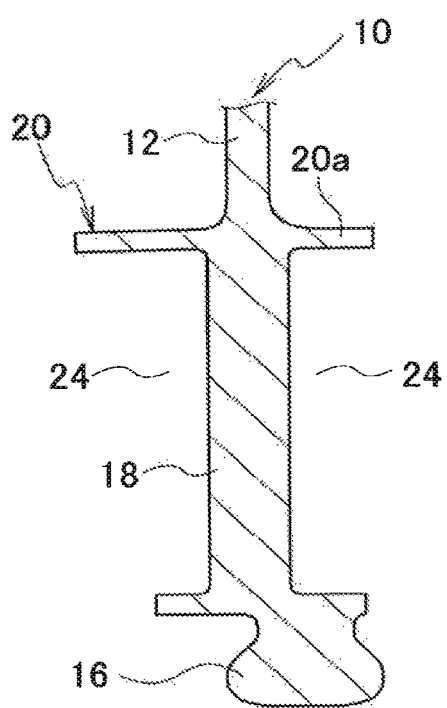
FIG. 4 is a cross-sectional view taken in the A-A direction of FIG. 3 in the first embodiment of the present disclosure.

FIG. 2 is a perspective view illustrating a configuration of a turbine rotor blade 10. FIG. 3 is a perspective view illustrating a configuration of a main part of the turbine rotor blade 10. FIG. 4 is a cross-sectional view taken in the A-A direction of FIG. 3. Incidentally, in FIG. 2, F indicates an upstream side of the combustion gas in a turbine axial direction, R indicates a downstream side of the combustion gas in the turbine axial direction, and X indicates a rotational direction of the turbine rotor blade 10. Here, the low-pressure turbine rotor blade is being described. However, the same descriptions are applicable to the high-pressure turbine rotor blade.

The turbine rotor blade 10 includes an airfoil portion 12, a dovetail portion 16 attached to a turbine disk 14, a shank portion 18 connecting the airfoil portion 12 and the dovetail portion 16, and a platform portion 20 provided between the airfoil portion 12 and the shank portion 18.

The airfoil portion 12 is formed extending in a longitudinal direction of the turbine rotor blade 10. The airfoil portion 12 includes a leading edge 12a located on the upstream side of the combustion gas, and a trailing edge 12b located on the downstream side of the combustion gas, a positive pressure surface 12c shaped like a concave surface, and a negative pressure surface 12d shaped like a convex surface. A tip shroud 22 is provided to an upper end of the airfoil portion 12.

The dovetail portion 16 has a function of attaching the turbine rotor blade 10 to the turbine disk 14 by being fitted into a disk groove 14a in the turbine disk 14. The shape of dovetail portion 16 and the shape of the disk groove 14a are mutually complementary to each other.

The shank portion 18 has a function of transmitting load from the airfoil portion 12 to the dovetail portion 16 by connecting the airfoil portion 12 and the dovetail portion 16. The shank portion 18 is provided to a base end side of the airfoil portion 12 in the longitudinal direction. The shank portion 18 is formed extending from the base end side of the airfoil portion 12 to the dovetail portion 16.

The shank portion 18 is formed curving in accordance with the shape of the airfoil portion 12. A side surface of the shank portion 18 on the side of the positive pressure surface of the airfoil portion 12 is formed in a concave shape, and the other side surface of the shank portion 18 on the side of the negative pressure surface of the airfoil portion 12 is formed in a convex shape The both sides of the shank portion 18 are each provided with a depression-shaped pocket 24 for the purpose of weight reduction.

The platform portion 20 has a function of shielding the combustion gas flowing in the turbine axial direction by being provided between the airfoil portion 12 and the shank portion 18 in a way that the platform portion 20 is integrally connected to the airfoil portion 12 and the shank portion 18. The platform portion 20 includes a platform portion body 20a formed extending in a direction intersecting the longitudinal direction of the turbine rotor blade 10.

The platform portion 20 includes a front skirt 20b provided on the leading edge side of the platform portion body 20a, and provided extending in the longitudinal direction of the turbine rotor blade 10. The platform portion 20 further includes a rear skirt 20c provided on the trailing edge side of the platform portion body 20a, and provided extending in the longitudinal direction of the turbine rotor blade 10. The inner surface of the rear skirt 20c is a convex curved surface which is formed in a convex curved shape toward the leading edge side. Incidentally, the inner surface of the rear skirt 20c may be an inclining plane surface, a vertical plane surface or the like instead of the convex curved surface.

The inner surface of the platform portion body 20a is provided with a platform portion body-side fitting groove 20d, and the inner surface of the front skirt 20b is provided with a front skirt-side fitting groove 20e. A shield member 30 to be described later is fitted into the platform portion body-side fitting groove 20d and the front skirt-side fitting groove 20e. The platform portion body-side fitting groove 20d is formed extending in a width direction intersecting a longitudinal direction of the platform portion body 20a. The front skirt-side fitting groove 20e is formed extending in a width direction intersecting a longitudinal direction of the front skirt 20b.

Because of its exposure to high temperature due to the combustion gas, the turbine rotor blade 10 is made from a lightweight and high-temperature strength material such as a ceramic matrix composite, a Ni-based superalloy, a TiAl alloy. The turbine rotor blade 10 is manufactured by unidirectional solidification casting, single crystal casting or the like.

Figure 5:
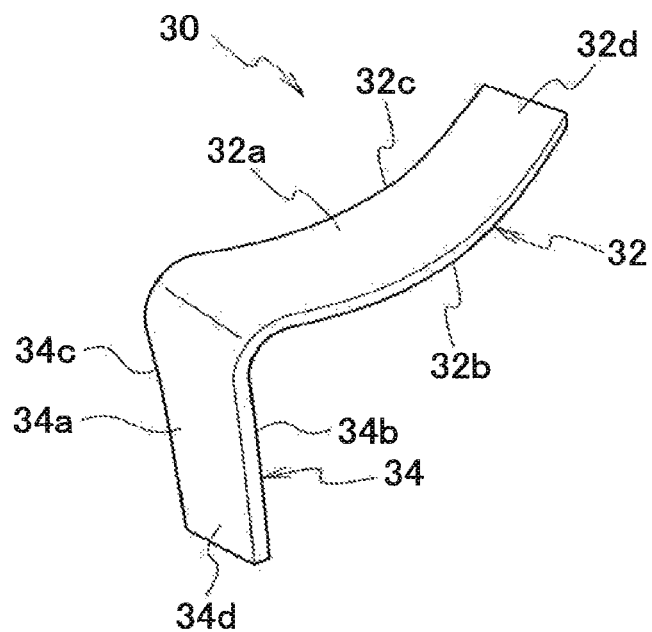
FIG. 5 is a perspective view illustrating a configuration of a shield member in the first embodiment of the present disclosure.
Figure 6:
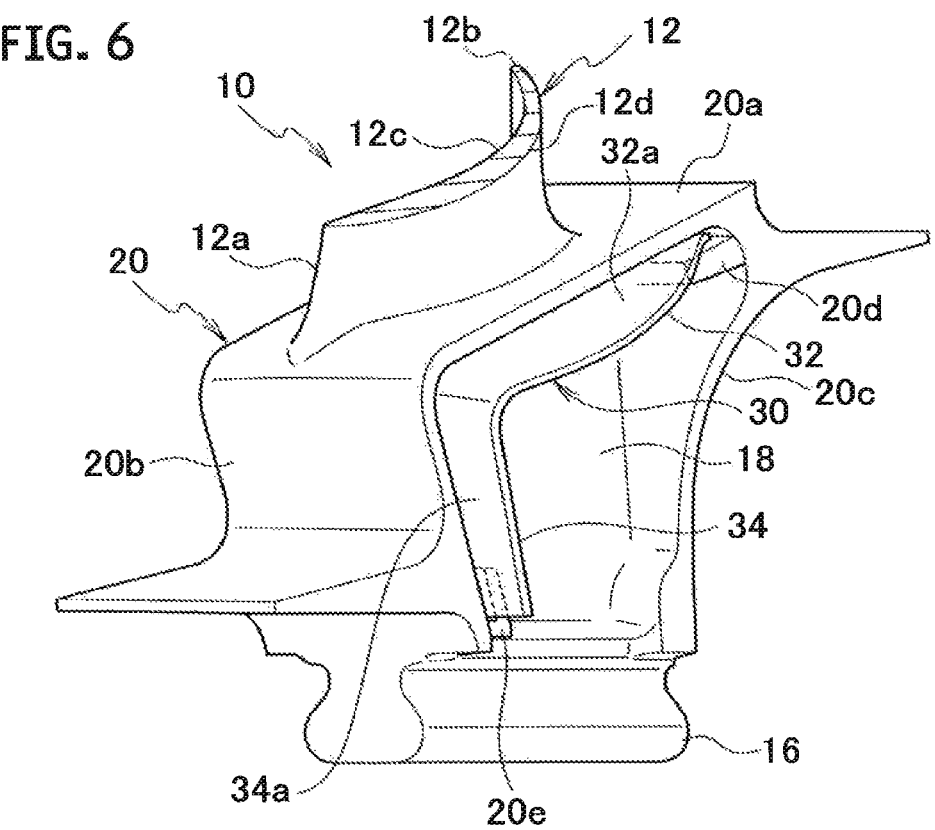
FIG. 6 is a perspective view illustrating how the shield member is attached to the turbine rotor blade in the first embodiment of the present disclosure.
Figure 7:
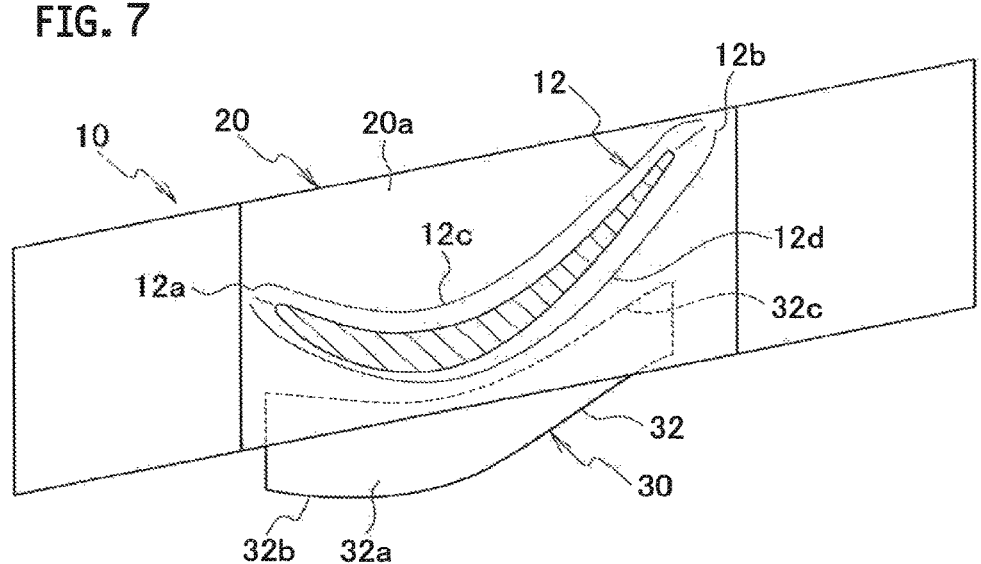
FIG. 7 is a top view illustrating how the shield member is attached to the turbine rotor blade in the first embodiment of the present disclosure.
Figure 8:
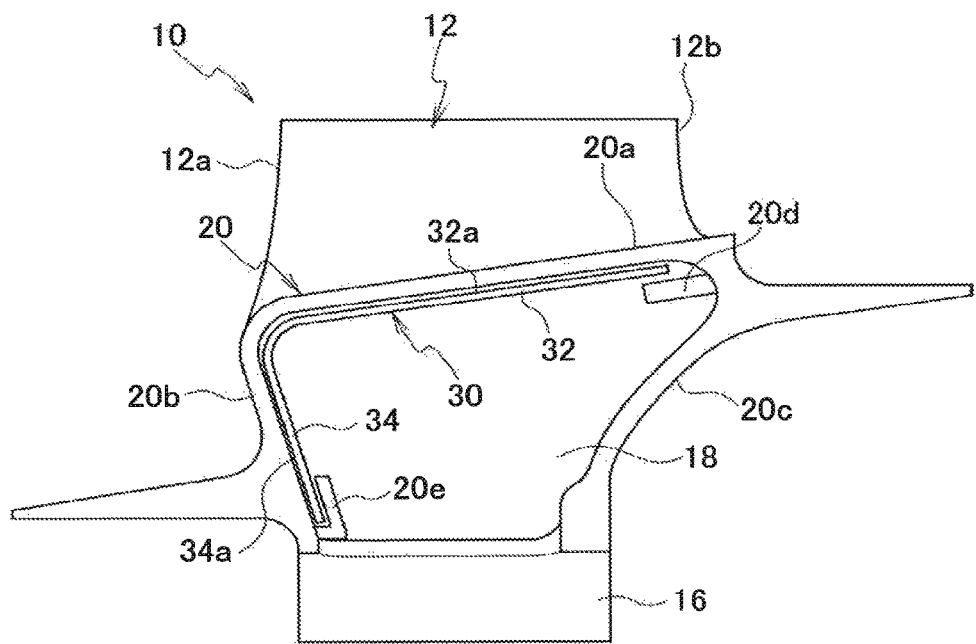
FIG. 8 is a cross-sectional view illustrating how the shield member is attached to the turbine rotor blade in the first embodiment of the present disclosure.

Next, the shield member will be described. FIG. 5 is a perspective view illustrating a configuration of the shield member 30. FIG. 6 is a perspective view illustrating how the shield member 30 is attached to the turbine rotor blade 10. FIG. 7 is a top view illustrating how the shield member 30 is attached to the turbine rotor blade 10. FIG. 8 is a cross-sectional view illustrating how the shield member 30 is attached to the turbine rotor blade 10.

The shield member 30 is disposed over gaps between the platform portions 20 of the adjacent turbine rotor blades 10. The shield member 30 is made from the ceramic matrix composite. The shield member 30 has a function of shielding the gaps between the platform portions 20. The shield member 30 includes a shield member body 32 and a leading edge-side shield portion 34 provided to a first end in a longitudinal direction of the shield member body 32.

The shield member body 32 is formed elongated and includes a first shield surface 32a located between the shank portions 18 connected to the platform portions 20 of the adjacent turbine rotor blades 10, and coming into contact with the inner surfaces of the platform portion bodies 20a of the adjacent turbine rotor blades 10 along the inner surfaces of the platform portion bodies 20a.

The first shield surface 32a has a function of shielding the gaps between the platform portion bodies 20a of the adjacent turbine rotor blades 10 by touching the inner surfaces of the platform portion bodies 20a of the adjacent turbine rotor blades 10 along the inner surfaces of the platform portion bodies 20a due to centrifugal force acting on the first shield surface 32a while the turbine rotor blades 10 are rotating. The first shield surface 32a is shaped substantially like a plane surface, corresponding to the inner surfaces of the platform portion bodies 20a of the adjacent turbine rotor blades 10.

The shield member body 32 is formed extending in the longitudinal direction of the shield member body 32, but curved in a plane in order to correspond to the shapes of the shank portions 18 of the adjacent turbine rotor blades 10. More specifically, one side edge 32b of the shield member body 32 in a width direction intersecting the longitudinal direction of the shield member body 32 is formed in a convex curved shape, while the other side edge 32c of the shield member body 32 in the width direction intersecting the longitudinal direction of the shield member body 32 is formed in a concave curved shape.

In the case where the shield member 30 is attached to the adjacent turbine rotor blades 10, the convex side edge 32b of the shield member body 32 corresponds to the concave side surface of the shank portion 18, while the concave side edge 32c of the shield member body 32 corresponds to the convex side surface of the other shank portion 18. This inhibits interference between the shield member body 32 and the shank portions 18 even in a case where the side surfaces of the shank portions 18 are formed curving in accordance with the shapes of the blade portions 12. Thus, the shield performance of the shield member 30 can be enhanced.

The shield member body 32 includes a shield member body-side fitting portion 32d provided to a second end in longitudinal-direction of the shield member body 32. The shield member body-side fitting portion 32d is fitted into the platform portion body-side fitting groove 20d. The shield member body 32 can be easily positioned by fitting the shield member body-side fitting portion 32d into the platform portion body-side fitting groove 20d.

The longitudinal-direction length of the shield member body 32 is set substantially equal to the length of the platform portion body 20a from its leading edge side to its trailing edge side, and is set within a range of 50 mm to 60 mm, for example.

The width of the shield member body 32 is set larger than the gap between the platform portion bodies 20a of the adjacent turbine rotor blades 10, but smaller than the space between the shank portions 18 of the adjacent turbine rotor blades 10. The width of the shield member body 32 at any point in the longitudinal direction of the shield member body 32 may be set equal to, or different from each other. The width of the shield member body 32 is set within a range of 20 mm to 30 mm, for example.

The thickness of the shield member body 32 is set at a thickness which enables the shield member body 32 to secure rigidity needed to retain its shape. The thickness of the shield member body 32 is set within a range of 1 mm to 2 mm, for example.

The leading edge-side shield portion 34 is formed elongated. A first end in a longitudinal direction of the leading edge-side shield portion 34 is integrally provided to the first end in the longitudinal direction of the shield member body 32 such that the leading edge-side shield portion 34 is bent from the shield member body 32. The leading edge-side shield portion 34 includes a second shield surface 34a. The second shield surface 34a is located between the shank portions 18 of the adjacent turbine rotor blades 10, and contacts with the inner surfaces of the front skirts 20b of the adjacent turbine rotor blades 10 along the inner surfaces of the front skirts 20b.

The second shield surface 34a has a function of shielding the gap between the front skirts 20b of the adjacent turbine rotor blades 10 by contacting with the inner surfaces of the front skirts 20b of the adjacent turbine rotor blades 10 along the inner surfaces of the front skirts 20b due to centrifugal force acting on the second shield surface 34a while the turbine rotor blades 10 are rotating. The second shield surface 34a is shaped like a plane surface, a curving surface or the like, corresponding to the inner surfaces of the front skirts 20b of the adjacent turbine rotor blades 10.

One side edge 34b and the other side edge 34c of the leading edge-side shield portion 34 in a width direction intersecting the longitudinal direction of the leading edge-side shield portion 34 may be formed substantially in a straight line, or may be formed curving.

The leading edge-side shield portion 34 includes a leading edge-side shield portion-side fitting portion 34d provided to a second end in longitudinal direction of the leading edge-side shield portion 34. The leading edge-side shield portion-side fitting portion 34d is fitted into the front skirt-side fitting groove 20e. The leading edge-side shield portion 34 can be easily positioned by fitting the leading edge-side shield portion-side fitting portion 34d into the front skirt-side fitting groove 20e.

The longitudinal-direction length of the leading edge-side shield portion 34 is set substantially equal to the length of the front skirt 20b from the airfoil portion 12-side to the dovetail portion 16-side. The longitudinal-direction length of the leading edge-side shield portion 34 is set within a range of 20 mm to 30 mm, for example.

The width of the leading edge-side shield portion 34 is set larger than the gap between the front skirts 20b of the adjacent turbine rotor blades 10, but smaller than the space between the shank portions 18 of the adjacent turbine rotor blades 10. The width of the leading edge-side shield portion 34 at any point in the longitudinal direction of the leading edge-side shield portion 34 may be set equal to, or different from each other. The width of the leading edge-side shield portion 34 is set within a range of 20 mm to 30 mm, for example.

The thickness of the leading edge-side shield portion 34 is set at a thickness which enables the leading edge-side shield portion 34 to secure rigidity needed to retain its shape. The thickness of the leading edge-side shield portion 34 is set within a range of 1 mm to 2 mm, for example. Incidentally, the thickness of the leading edge-side shield portion 34 may be set equal to that of the shield member body 32.

The shield member 30 is made from the ceramic matrix composite. The ceramic matrix composite is a ceramic fiber-reinforced ceramic composite material obtained by reinforcing a ceramic matrix with ceramic fibers. For example, a SiC/SiC composite material obtained by reinforcing a SiC matrix with SiC fibers, a SiC/$Al_2O_3$ composite material obtained by reinforcing a SiC matrix with $Al_2O_3$ fibers, or the like may be used as the ceramic matrix composite. The ceramic matrix composite is excellent in heat resistance and oxidation resistance. For this reason, although the shield member 30 is exposed to the combustion gas, it is possible to inhibit damage on the shield member 30, such as deformation, oxidation and the like caused by the heat exposure. In addition, the ceramic matrix composite is more lightweight than heat resistant alloys (such as a Ni-based superalloy and a TiAl alloy). For this reason, it is possible to reduce the weight of the aircraft turbofan engine 8 and the like. Moreover, the ceramic matrix composite is good in toughness and the like as a result of the ceramic fiber reinforcement. For this reason, even in a case where the shield member 30 is impacted by the rotations of the turbine rotor blades 10, and the like, fracture of the shield member 30 can be inhibited.

Next, a method of manufacturing the shield member 30 will be described. To begin with, a preform corresponding to the shape of the shield member 30 is formed by trimming, stitching, etc. a two-dimensional or three-dimensional fabric made from ceramic fibers. SiC fibers, $Al_2O_3$ fibers, and the like may be used as the ceramic fibers. The preform is placed inside a mold. A polymer material for the matrix is filled into the mold. Thereby, the preform is impregnated with the polymer material. The preform impregnated with the polymer material is heated and fired to form a ceramic matrix of SiC or the like. Incidentally, chemical vapor infiltration, solid phase infiltration and the like may be used for the matrix forming. The chemical vapor infiltration makes it possible to form a ceramic matrix of SiC or the like by a thermal decomposition reaction and the like of a material gas. The solid phase infiltration makes it possible to form a ceramic matrix of SiC or the like by impregnating the preform with a mixed powder of Si and C, for example, making Si and C react on each other in the preform. In this manner, the shield member 30 can be made from the ceramic matrix composite.

Figure 9:
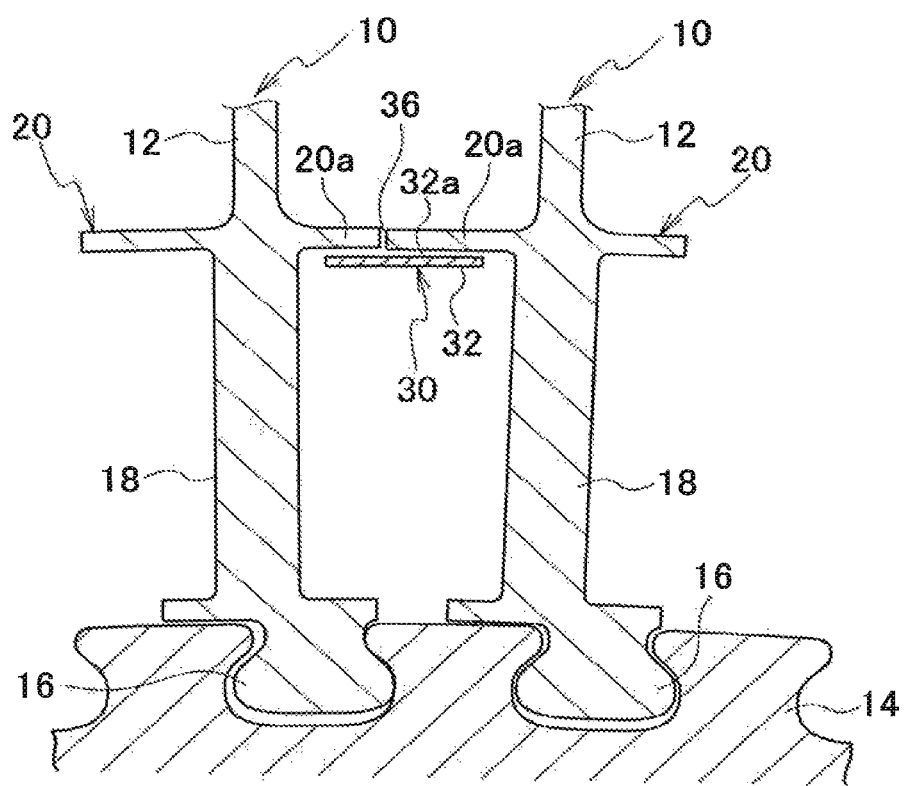
FIG. 9 is a cross-sectional view taken in the A-A direction of FIG. 2 in the first embodiment of the present disclosure.
Figure 10:
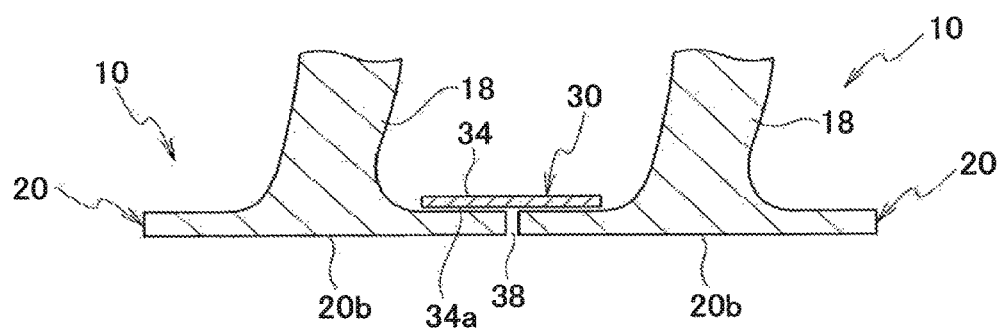
FIG. 10 is a cross-sectional view taken in the B-B direction of FIG. 2 in the first embodiment of the present disclosure.

Next, how the shield member 30 works will be described. FIG. 9 is a cross-sectional view taken in the A-A direction of FIG. 2. FIG. 10 is a cross-sectional view taken in the B-B direction of FIG. 2.

First of all, the shield member 30 is attached over the gaps 36, 38 between the platform portions 20 of the adjacent turbine rotor blades 10. More specifically, the shield member 30 is attached by being positioned by fitting the shield member body-side fitting portion 32d into the platform portion body-side fitting groove 20d, and fitting the leading edge-side shield portion-side fitting portion 34d into the front skirt-side fitting groove 20e. Thereby, the shield member 30 is disposed facing the gaps 36, 38 between the platform portions 20 of the adjacent turbine rotor blades 10.

While receiving a combustion gas flow flowing in the turbine axial direction, the turbine rotor blades 10 makes rotary motion integrally with the turbine disk 14. This rotary motion makes the centrifugal force act on the turbine rotor blades 10. This centrifugal force makes the shield member 30, disposed over the gaps 36, 38 between the platform portions 20 of the adjacent turbine rotor blades 10, touch and come into close contact with the inner surfaces of the platform portions 20. Thus, the gaps 36, 38 between the platform portions 20 are shielded with the shield member 30.

More specifically, the gap 36 between the platform portion bodies 20a of the adjacent turbine rotor blades 10 is shielded with the first shield surface 32a of the shield member body 32 since the first shield surface 32a touches and comes into close contact with the inner surfaces of the platform portion bodies 20a along the inner surfaces of the platform portion bodies 20a.

Meanwhile, the gap 38 between the front skirts 20b of the adjacent turbine rotor blades 10 is shielded with the second shield surface 34a of the leading edge-side shield portion 34 since the second shield surface 34a touches and comes into close contact with the inner surfaces of the front skirts 20b along the inner surfaces of the front skirts 20b.

Thus, the combustion gas is inhibited from flowing into the inside of the platform portions 20 through the gap 36 between the platform portion bodies 20a and the gap 38 between the front skirts 20b. This makes it possible to inhibit the exposure of the turbine disk 14 to the heat of the combustion gas.

The foregoing configuration makes it possible to dispose the shield member, made from the ceramic matrix composite, over the gaps between the platform portions of the adjacent turbine rotor blades. Thereby, the combustion gas can be inhibited from flowing into the inside of the platform portions through the gaps between the platform portions of the adjacent turbine rotor blades. Thus, the heat exposure of the turbine disk can be inhibited. In addition, since the shield member is made from the ceramic matrix composite, damage on the shield member due to the heat exposure can be inhibited although the shield member is exposed to the combustion gas.

According to the foregoing configuration, even in the case where the shank portion is formed curving in accordance with the shape of the airfoil portion, the shield member body is formed curved in a plane in accordance with the side surface of the shank portion. This inhibits the interference between the shield member body and the shank portion. Thus, the shield performance of the shield member can be enhanced.

The foregoing configuration makes it possible to easily attach the shield member over the gaps between the platform portions of the adjacent turbine rotor blades by fitting the shield member body-side fitting portion into the platform portion body-side fitting groove and fitting the leading edge-side shield portion-side fitting portion into the front skirt-side fitting groove. The foregoing configuration further makes it possible to easily and accurately position and dispose the shield member.

[Second Embodiment]

Figure 11:
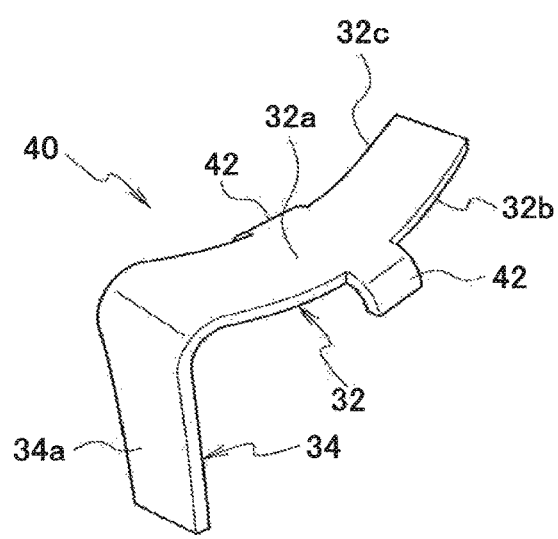
FIG. 11 is a perspective view illustrating a configuration of a shield member in a second embodiment of the present disclosure.
Figure 12:
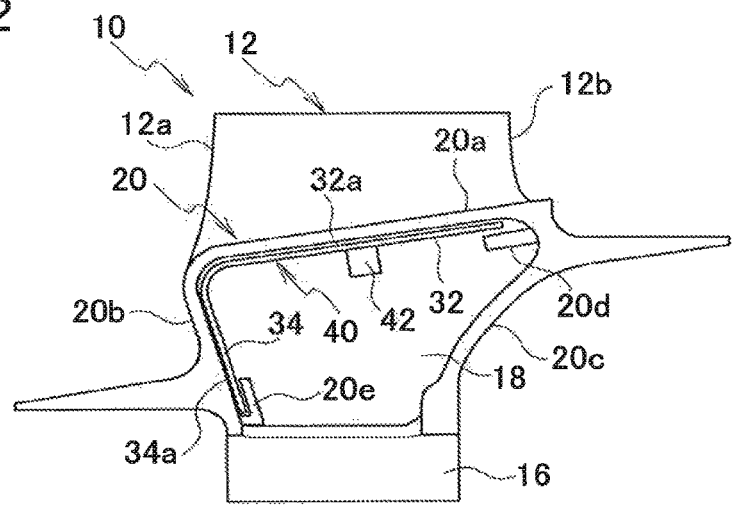
FIG. 12 is a cross-sectional view illustrating how the shield member is attached to the turbine rotor blade in the second embodiment of the present disclosure.
Figure 13:
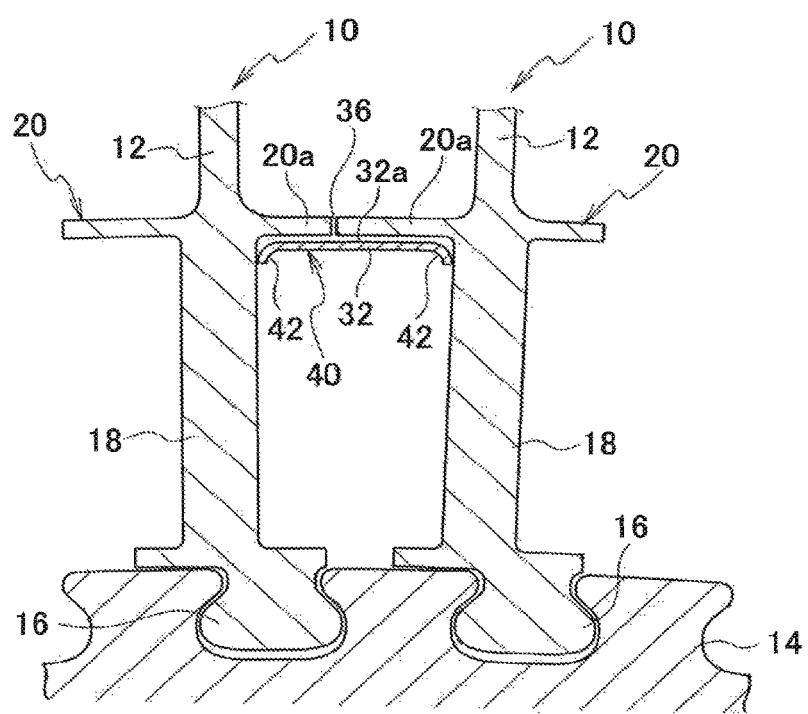
FIG. 13 is a cross-sectional view illustrating how the shield member is attached between platform portions of the adjacent turbine rotor blades in the second embodiment of the present disclosure.

Next, using the drawings, detailed descriptions will be provided for a second embodiment of the present disclosure. FIG. 11 is a perspective view illustrating a configuration of a shield member 40 of the second embodiment. FIG. 12 is a cross-sectional view illustrating how the shield member 40 of the second embodiment is attached to the turbine rotor blade 10. FIG. 13 is a cross-sectional view illustrating how the shield member 40 of the second embodiment is attached over a gap between the platform portions 20 of the adjacent turbine rotor blades 10. Incidentally, FIG. 13 is the diagram corresponding to FIG. 9 concerning the first embodiment, and is the cross-sectional view taken in the A-A direction of FIG. 2 in the case where the shield member 40 of the second embodiment is attached there instead of the shield member 30 of the first embodiment. In addition, the same elements are denoted by the same reference signs, and detailed descriptions for such elements are omitted.

The shield member 40 of the second embodiment is different from the shield member 30 of the first embodiment in that the shield member 40 includes restriction portions 42. The restriction portions 42 are provided at parts of both sides 32b, 32c in the longitudinal direction of the shield member body 32. The restriction portions 42 are formed projecting in the width direction intersecting the longitudinal direction of the shield member body 32, and restrict the movement of the shield member 40 in the width direction by coming into contact with the corresponding side surfaces of the shank portions 18 of the adjacent turbine rotor blades 10.

When the shield member 40 is attached over the gaps between the platform portions 20 of the adjacent turbine rotor blades 10, the restriction portions 42 have a function of restricting the movement of the shield member 40 in the width direction by coming into surface contact or line contact with the corresponding side surfaces of the shank portions 18 of the adjacent turbine rotor blades 10, and thereby holding the shield member 40. This restricts the movement of the shield member 40 in the width direction, and accordingly inhibits the shield member 40 from coming off the turbine rotor blades 10 in an initial stage of the rotary motion of the turbine rotor blades and the like. This further enhances the accuracy of positioning the shield member 40.

The restriction portions 42 are formed projecting in the width direction intersecting the longitudinal direction of the shield member body 32, and curving toward the back surface of the first shield surface 32a. The restriction portions 42 may be shaped like a rectangle, a triangle, a circle and the like.

The side edges 32b, 32c maybe provided with the respective restriction portions 42 at the same position, or at different positions, in the longitudinal direction of the shield member body 32. The both side edges 32b, 32c may be each provided with one restriction portion 42, or with multiple restriction portions 42. Furthermore, the number of restriction portions 42 provided to the one side edge 32b and the number of restriction portions 42 provided to the other side edge 32c may be different from each other. The side edges 32b, 32c may be provided with the restriction portions 42 at their center portions in the longitudinal direction of the shield member body 32, respectively. Otherwise, the side edges 32b, 32c may be provided with the restriction portions 42 at the first end-side positions, or the second end-side positions, in the longitudinal direction of the shield member body 32, respectively.

In the case where the shielding member 40 is made from the ceramic matrix composite, at first, a preform corresponding to the shape of the shield member 40 is formed by trimming, stitching, etc. a two-dimensional or three-dimensional fabric made from ceramic fibers. The preform is placed inside a mold. Its portions corresponding to the restriction portions 42 are curved and set in the mold to be molded into the restriction portions 42. The ceramic matrix is formed in the same way as that for the shield member 30 of the first embodiment is. For this reason, detailed descriptions will be omitted.

The foregoing configuration can bring about the same effects as the shield member of the first embodiment does. Furthermore, when the shield member is attached over the gaps between the platform portions of the adjacent turbine rotor blades, the foregoing configuration makes the restriction portions of the shield member body come into contact with the corresponding side surfaces of the shank portions of the adjacent turbine rotor blades to hold the shield member. The foregoing configuration thereby restricts the movement of the shield member in the width direction, and thus inhibits the shield member from coming off. Moreover, the foregoing configuration enhances the accuracy of positioning the shield member.

[Third Embodiment]

Figure 14:
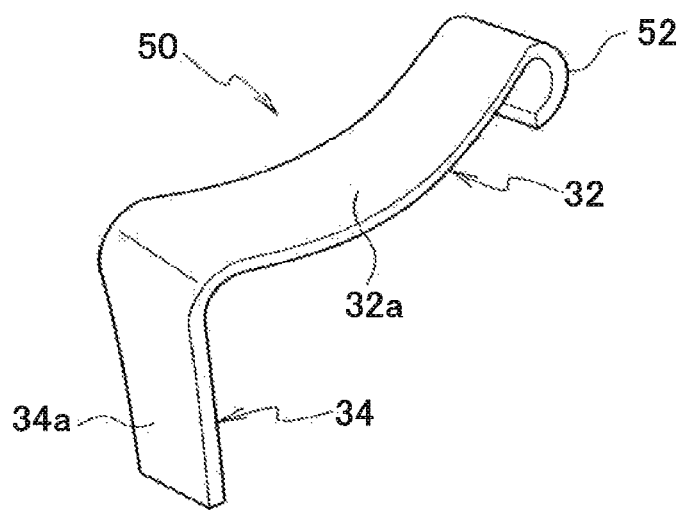
FIG. 14 is a perspective view illustrating a configuration of a shield member in a third embodiment of the present disclosure.
Figure 15:
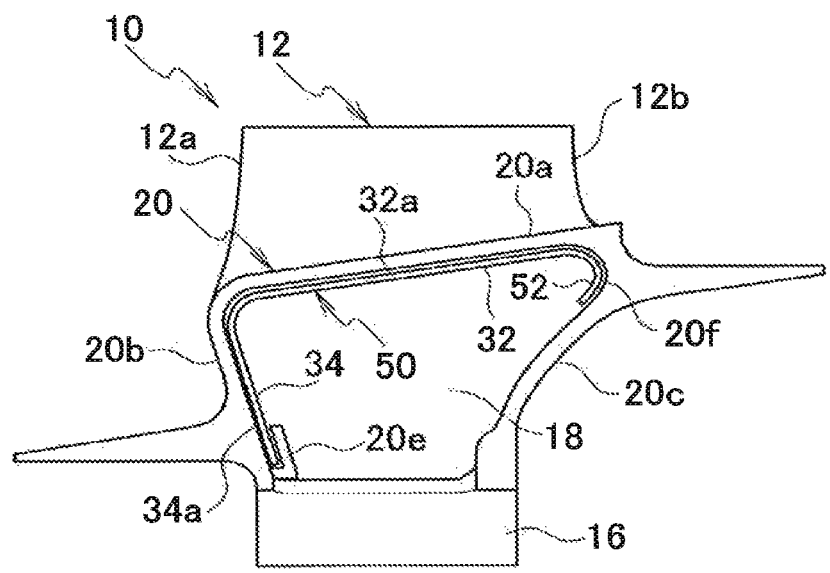
FIG. 15 is a cross-sectional view illustrating how the shield member is attached to the turbine rotor blade in the third embodiment of the present disclosure.

Next, using the drawings, detailed descriptions will be provided for a third embodiment of the present disclosure. FIG. 14 is a perspective view illustrating a configuration of a shield member 50 of the third embodiment. FIG. 15 is a cross-sectional view illustrating how the shield member 50 of the third embodiment is attached to the turbine rotor blade 10. Incidentally, the same elements are denoted by the same reference signs, and detailed descriptions for such elements are omitted.

The rear skirt 20c of the platform portion 20 includes a holding portion 20f, provided to the inner surface of the rear skirt 20c, for holding the second end in the longitudinal direction of the shield member body 32 of the shield member 50 of the third embodiment. The holding portion 20f is formed from a holding surface which is made from a part of the inner surface of the rear skirt 20c, and which is a convex curved surface projecting toward the leading edge side. The shield member 50 of the third embodiment is different from the shield member 30 of the first embodiment in that the shield member 50 includes a curving portion 52 provided to the second end in the longitudinal direction of the shield member body 32, formed curving toward the back surface of the first shield surface 32a, and configured to come into contact with the holding portions 20f of the rear skirts 20c of the adjacent turbine rotor blades 10.

When the shield member 50 is attached over the gaps between the platform portions 20 of the adjacent turbine rotor blades 10, the curving portion 52 provided to the second end of the shield member body 32 comes into surface contact or line contact with the holding surface which is the holding portion 20f of the rear skirt 20c, and thereby holds the shield member body 32. Therefore the platform portion body-side fitting groove 20d provided to the platform portion body 20a for holding the shield member body 32 is made unnecessary. This simplifies the configuration of the platform portion 20, and accordingly makes it possible to easily manufacture the turbine rotor blade 10. Incidentally, the holding surface of the holding portion 20f is not limited to the convex curved surface, and may be an inclining plane surface. Otherwise, the holding portion 20f may be formed by providing a protrusion to the inner surface of the rear skirt.

In the case where the shield member 50 is made from the ceramic matrix composite, at first, a preform corresponding to the shape of the shield member 50 is formed by trimming, stitching, etc. a two-dimensional or three-dimensional fabric made from ceramic fibers. The preform is placed inside a mold. Its portion corresponding to the curving portion 52 is curved and set in the mold to be molded into the curving portion 52. The ceramic matrix is formed in the same way as that for the shield member 30 of the first embodiment is. For this reason, detailed descriptions will be omitted.

The foregoing configuration can bring about the same effects as the shield member of the first embodiment does. Furthermore, the platform portion body-side fitting groove provided to the platform portion body for holding the shield member body is made unnecessary. The foregoing configuration thus simplifies the configuration of the platform portion, and accordingly makes it possible to easily manufacture the turbine rotor blade.

[Fourth Embodiment]

Figure 16:
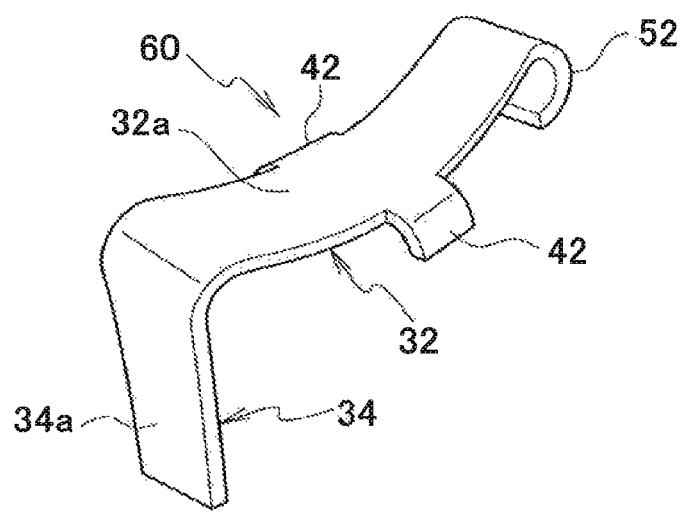
FIG. 16 is a perspective view illustrating a configuration of a shield member in a fourth embodiment of the present disclosure.
Figure 17:
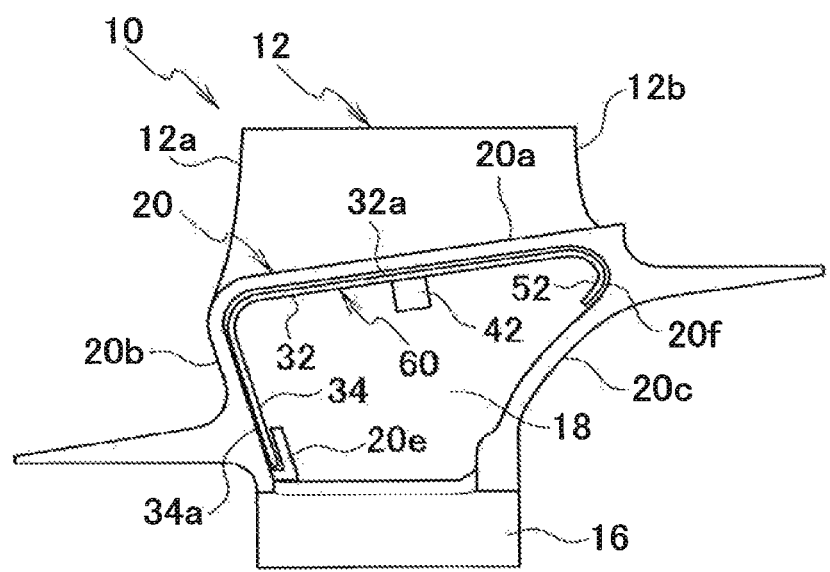
FIG. 17 is a cross-sectional view illustrating how the shield member is attached to the turbine rotor blade in the fourth embodiment of the present disclosure.

Next, using the drawings, detailed descriptions will be provided for a fourth embodiment of the present disclosure. FIG. 16 is a perspective view illustrating a configuration of a shield member 60 of the fourth embodiment. FIG. 17 is a cross-sectional view illustrating how the shield member 60 of the fourth embodiment is attached to the turbine rotor blade 10. Incidentally, the same elements are denoted by the same reference signs, and detailed descriptions for such elements are omitted.

The rear skirt 20c of the platform portion 20 includes a holding portion 20f, provided to the inner surface of the rear skirt 20c, for holding the second end in the longitudinal direction of the shield member body 32 of the shield member 60 of the fourth embodiment. The shield member 60 of the fourth embodiment is different from the shield member 30 of the first embodiment in that the shield member 60 includes the restriction portions 42 of the shield member 40 of the second embodiment, and the curving portion 52 of the shield member 50 of the third embodiment.

In the case where the shielding member 60 is made from the ceramic matrix composite, at first, a preform corresponding to the shape of the shield member 60 is formed by trimming, stitching, etc. a two-dimensional or three-dimensional fabric made from ceramic fibers. The preform is placed inside a mold. Its portions corresponding to the restriction portions 42 and the curving portion 52 are curved and set in the mold to be molded into the restriction portions 42 and the curving portion 52. The ceramic matrix is formed in the same way as that for the shield member 30 of the first embodiment is. For this reason, detailed descriptions will be omitted.

The foregoing configuration not only can bring about the same effects as the shield member of the first embodiment does, but also can bring about the same effects as the shield member of the second embodiment does, and the same effects as the shield member of the third embodiment does.

[Fifth Embodiment]

Figure 18:
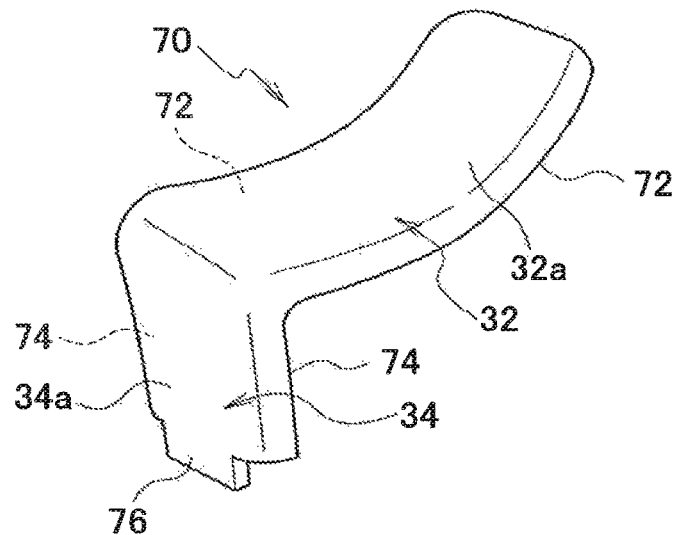
FIG. 18 is a perspective view illustrating a configuration of a shield member in a fifth embodiment of the present disclosure.
Figure 19:
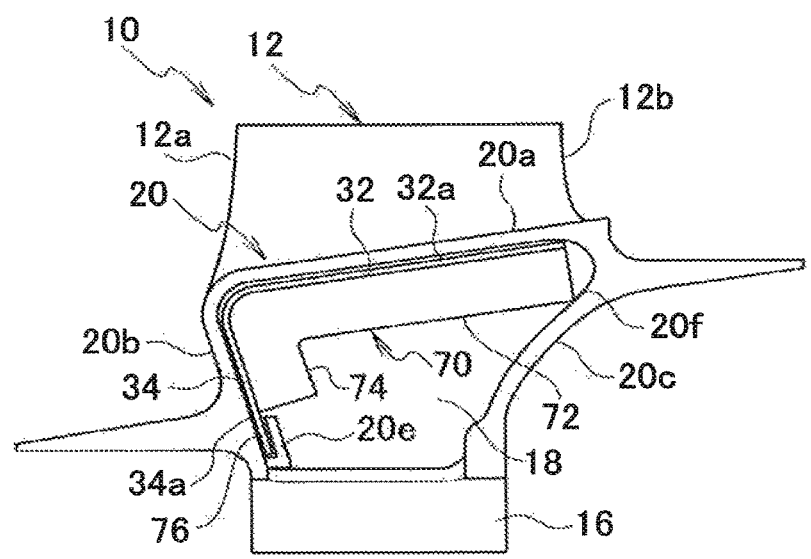
FIG. 19 is a cross-sectional view illustrating how the shield member is attached to the turbine rotor blade in the fifth embodiment of the present disclosure.
Figure 20:
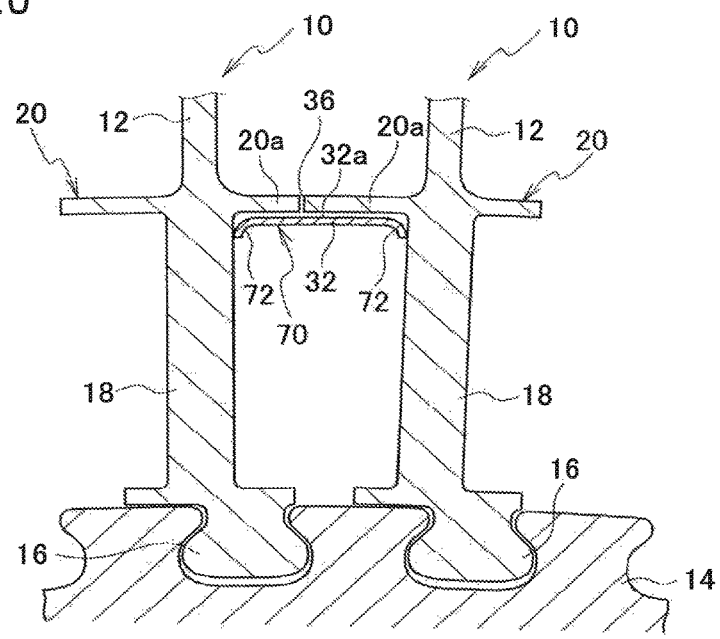
FIG. 20 is a cross-sectional view illustrating how the shield member is attached over gaps between platform portions of the adjacent turbine rotor blades in the fifth embodiment of the present disclosure.
Figure 21:
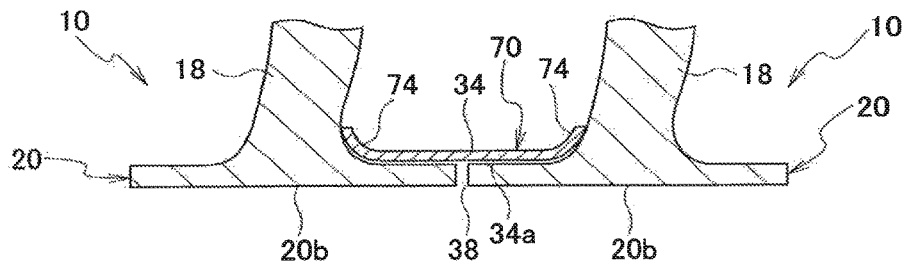
FIG. 21 is a cross-sectional view illustrating how the shield member is attached over gaps between platform portions of the adjacent turbine rotor blades in the fifth embodiment of the present disclosure.

Next, using the drawings, detailed descriptions will be provided for a fifth embodiment of the present disclosure. FIG. 18 is a perspective view illustrating a configuration of a shield member 70 of the fifth embodiment. FIG. 19 is a cross-sectional view illustrating how the shield member 70 of the fifth embodiment is attached to the turbine rotor blade 10. FIG. 20 is a cross-sectional view illustrating how the shield member 70 of the fifth embodiment is attached over a gap between the platform portions 20 of the adjacent turbine rotor blades 10. FIG. 21 is a cross-sectional view illustrating how the shield member 70 of the fifth embodiment is attached over a gap between the platform portions 20 of the adjacent turbine rotor blades 10. Incidentally, FIG. 20 is the diagram corresponding to FIG. 9 concerning the first embodiment, and is the cross-sectional view taken in the A-A direction of FIG. 2 in the case where the shield member 70 of the fifth embodiment is attached there instead of the shield member 30 of the first embodiment. FIG. 21 is the diagram corresponding to FIG. 10 concerning the first embodiment, and is the cross-sectional view taken in the B-B direction of FIG. 2 in the case where the shield member 70 of the fifth embodiment is attached there instead of the shield member 30 of the first embodiment. In addition, the same elements are denoted by the same reference signs, and detailed descriptions for such elements are omitted.

The rear skirt 20c of the platform portion 20 includes a holding portion 20f, provided to the inner surface of the rear skirt 20c, for holding the second end in the longitudinal direction of the shield member body 32 of the shield member 70 of the fifth embodiment. The shield member 70 of the fifth embodiment includes first contact portions 72 provided to full lengths of both sides in the longitudinal direction of the shield member body 32. The first contact portions 72 are formed projecting in the width direction intersecting the longitudinal direction of the shield member body 32, and curving toward the back surface of the first shield surface 32a. The first contact portions 72 come into contact with the corresponding side surfaces of the shank portions 18 of the adjacent turbine rotor blades 10, and with the holding portion 20f of the rear skirt 20c. The shield member 70 further includes second contact portions 74 provided to full lengths of both sides in in the longitudinal direction of the leading edge-side shield portion 34. The second contact portions 74 are formed projecting in the width direction intersecting the longitudinal direction of the leading edge-side shield portion 34, and curving toward the back surface of the second shield surface 34a. The second contact portions 74 come into contact with the corresponding side surfaces of the shank portions 18 of the adjacent turbine rotor blades 10. As described above, the shield member 70 of the fifth embodiment is different from the shield member 30 of the first embodiment in that the shield member 70 includes the first contact portions 72 and the second contact portions 74.

When the shield member 70 is disposed facing the gaps 36, 38 between the platform portions 20 of the adjacent turbine rotor blades 10 by being attached over the gaps 36, 38, the first contact portions 72 provided to the shield member body 32 come into surface contact or line contact with the corresponding side surfaces of the shank portions 18 of the adjacent turbine rotor blades 10, and the second contact portions 74 provided to the leading edge-side shield portion 34 come into surface contact or line contact with the corresponding side surfaces of the shank portions 18 of the adjacent turbine rotor blades 10. The foregoing configuration thereby makes the first contact portions 72 and the second contact portions 74 hold the shield member 70. This restricts the movement of the shield member 70 in the width direction, and accordingly inhibits the shield member 70 from coming off the turbine rotor blades 10 in an initial stage of the rotary motion of the turbine rotor blades and the like. This further enhances the accuracy of positioning the shield member 70.

Furthermore, when the shield member 70 is disposed facing the gaps 36, 38 between the platform portions 20 of the adjacent turbine rotor blades 10 by being attached over the gaps 36, 38, the rear parts of the first contact portions 72 provided to the shield member body 32 come into contact with the holding portions 20f of the rear skirts 20c, and thereby holds the shield member body 32. Therefore the platform portion body-side fitting groove 20d provided to the platform portion body 20a for holding the shield member main body 32 is made unnecessary. This simplifies the configuration of the platform portion 20, and accordingly makes it possible to easily manufacture the turbine rotor blade 10.

Moreover, the shield member 70 is provided, at the second end of the leading edge-side shield portion 34 on the side of the dovetail portion 16, with a projectingly-formed leading edge-side shield portion-side fitting portion 76 configured to be fitted into the front skirt-side fitting groove 20e provided in the inner surface of the front skirt 20b.

In the case where the shield member 70 is made from the ceramic matrix composite, at first, a preform corresponding to the shape of the shield member 70 is formed by trimming, stitching, etc. a two-dimensional or three-dimensional fabric made from ceramic fibers. The preform is placed inside a mold. Its portions corresponding to the first contact portions 72 and the second contact portions 74 are curved and set in the mold to be molded into the first contact portions 72 and the second contact portions 74. The ceramic matrix is formed in the same way as that for the shield member 30 of the first embodiment is. For this reason, detailed descriptions will be omitted.

The foregoing configuration can bring about the same effects as the shield member of the first embodiment does. Furthermore, when the shield member is attached over the gaps between the platform portions of the adjacent turbine rotor blades, the foregoing configuration makes the first contact portions, provided to the shield member body, come into contact with the corresponding side surfaces of the shank portions of the adjacent turbine rotor blades, and makes the second contact portions, provided to the leading edge-side shield portion, come into contact with the corresponding side surfaces of the shank portions of the adjacent turbine rotor blades. The foregoing configuration thereby makes the first contact portions and the second contact portions hold the shield member. This restricts the movement of the shield member in the width direction, and accordingly inhibits the shield member from coming off the turbine rotor blades. This further enhances the accuracy of positioning the shield member.

Furthermore, when the shield member is attached over the gaps between the platform portions of the adjacent turbine rotor blades, the foregoing configuration makes the first contact portions, provided to the shield member body, come into contact with the holding portions of the rear skirts, and thus hold the shield member body. Therefore the platform portion body-side fitting groove provided to the platform portion body is made unnecessary, and accordingly this makes it possible to easily manufacture the turbine rotor blade.

The present disclosure is useful for a jet engine such as an aircraft turbofan engine, since the present disclosure makes it possible to shield the gaps between the platform portions of the adjacent turbine rotor blades.

What is claimed is:
1. A shield member, disposed over a gap between platform portions of adjacent turbine rotor blades, made from a ceramic matrix composite, and configured to shield the gap between the platform portions, wherein
   the ceramic matrix composite is a ceramic fiber-reinforced ceramic composite material obtained by reinforcing a ceramic matrix with ceramic fibers.

2. A shield member, disposed over a gap between platform portions of adjacent turbine rotor blades, made from a ceramic matrix composite, and configured to shield the gap between the platform portions, wherein the platform portions each include
a platform portion body formed extending in a direction intersecting a longitudinal direction of a corresponding one of the turbine rotor blades, and
a front skirt provided on a leading edge side of the platform portion body, and the shield member comprises
a shield member body formed elongated and including a first shield surface located between shank portions connected to the platform portions of the adjacent turbine rotor blades, the first shield surface configured to shield a gap between the platform portion bodies of the adjacent turbine rotor blades by coming into contact with inner surfaces of the platform portion bodies along the inner surfaces of the platform portion bodies, and
a leading edge-side shield portion formed elongated and including a second shield surface located between the shank portions of the adjacent turbine rotor blades, a first end in a longitudinal direction of the leading edge-side shield portion integrally provided to a first end in a longitudinal direction of the shield member body while bent from the shield member body, the second shield surface configured to shield a gap between the front skirts of the adjacent turbine rotor blades by coming into contact with inner surfaces of the front skirts along the inner surfaces of the front skirts.

3. The shield member according to claim 2, further comprising
restriction portions provided at parts of both sides in the longitudinal direction of the shield member body, the restriction portions formed projecting in a width direction intersecting the longitudinal direction of the shield member body, and curving toward a back surface of the first shield surface, the restriction portions configured to restrict movement of the shield member in the width direction by coming into contact with side surfaces of the shank portions of the adjacent turbine rotor blades.

4. The shield member according to claim 2, wherein
the platform portions each include a rear skirt provided on a trailing edge side of the corresponding platform portion body,
the rear skirt includes a holding portion, provided to an inner surface of the rear skirt, for holding a second end in the longitudinal direction of the shield member body, and
the shield member further comprises a curving portion provided to the second end in the longitudinal direction of the shield member body, formed curving toward a back surface of the first shield surface, and configured to come into contact with the holding portions of the rear skirts of the adjacent turbine rotor blades.

5. The shield member according to claim 3, wherein
the platform portions each include a rear skirt provided on a trailing edge side of the corresponding platform portion body,
the rear skirt includes a holding portion, provided to an inner surface of the rear skirt, for holding a second end in the longitudinal direction of the shield member body, and
the shield member further comprises a curving portion provided to the second end in the longitudinal direction of the shield member body, formed curving toward a back surface of the first shield surface, and configured to come into contact with the holding portions of the rear skirts of the adjacent turbine rotor blades.

6. The shield member according to claim 2, wherein
the platform portions each include a rear skirt provided on a trailing edge side of the corresponding platform portion body,
the rear skirt includes a holding portion, provided to an inner surface of the rear skirt, for holding a second end in the longitudinal direction of the shield member body, and
the shield member further comprises
first contact portions provided to full lengths of both sides in the longitudinal direction of the shield member body, the first contact portions formed projecting in a width direction intersecting the longitudinal direction of the shield member body, and curving toward a back surface of the first shield surface, the first contact portions configured to come into contact with side surfaces of the shank portions of the adjacent turbine rotor blades, and with the holding portions of the rear skirts, and
second contact portions provided to full lengths of both sides in a longitudinal direction of the leading edge-side shield portion, the second contact portions formed projecting in a width direction intersecting the longitudinal direction of the leading edge-side shield portion, and curving toward a back surface of the second shield surface, the second contact portions configured to come into contact with the side surfaces of the shank portions of the adjacent turbine rotor blades.

7. The shield member according to claim 2, wherein
the shank portions are each formed curving corresponding to a shape of an airfoil portion of the corresponding turbine rotor blade, and
the shield member body is formed curved in a plane corresponding to side surfaces of the shank portions of the adjacent turbine rotor blades.

8. The shield member according to claim 3, wherein
the shank portions are each formed curving corresponding to a shape of an airfoil portion of the corresponding turbine rotor blade, and
the shield member body is formed curved in a plane corresponding to side surfaces of the shank portions of the adjacent turbine rotor blades.

9. The shield member according to claim 4, wherein
the shank portions are each formed curving corresponding to a shape of an airfoil portion of the corresponding turbine rotor blade, and
the shield member body is formed curved in a plane corresponding to side surfaces of the shank portions of the adjacent turbine rotor blades.

10. The shield member according to claim 5, wherein
the shank portions are each formed curving corresponding to a shape of an airfoil portion of the corresponding turbine rotor blade, and
the shield member body is formed curved in a plane corresponding to side surfaces of the shank portions of the adjacent turbine rotor blades.

11. The shield member according to claim 2, wherein
the platform portions each include
a platform portion body-side fitting groove provided to the inner surface of the platform portion body, and
a front skirt-side fitting groove provided to the inner surface of the front skirt, the shield member body includes a shield member body-side fitting portion provided to a second end in the longitudinal direction of the shield member body, and configured to be fitted into the platform portion body-side fitting groove, and the leading edge-side shield portion includes a leading edge-side shield portion-side fitting portion provided to a second end in a longitudinal direction of the leading edge-side shield portion, and configured to be fitted into the front skirt-side fitting groove.

12. The shield member according to claim 3, wherein the platform portions each include a platform portion body-side fitting groove provided to the inner surface of the platform portion body, and a front skirt-side fitting groove provided to the inner surface of the front skirt, the shield member body includes a shield member body-side fitting portion provided to a second end in the longitudinal direction of the shield member body, and configured to be fitted into the platform portion body-side fitting groove, and the leading edge-side shield portion includes a leading edge-side shield portion-side fitting portion provided to a second end in a longitudinal direction of the leading edge-side shield portion, and configured to be fitted into the front skirt-side fitting groove.

13. The shield member according to claim 4, wherein the platform portion includes a front skirt-side fitting groove provided in the inner surface of the front skirt, and the leading edge-side shield portion includes a leading edge-side shield portion-side fitting portion provided to a second end in a longitudinal direction of the leading edge-side shield portion, and configured to be fitted into the front skirt-side fitting groove.

14. The shield member according to claim 5, wherein the platform portion includes a front skirt-side fitting groove provided in the inner surface of the front skirt, and the leading edge-side shield portion includes a leading edge-side shield portion-side fitting portion provided to a second end in a longitudinal direction of the leading edge-side shield portion, and configured to be fitted into the front skirt-side fitting groove.

15. The shield member according to claim 6, wherein the platform portion includes a front skirt-side fitting groove provided in the inner surface of the front skirt, and the leading edge-side shield portion includes a leading edge-side shield portion-side fitting portion provided to a second end in a longitudinal direction of the leading edge-side shield portion, and configured to be fitted into the front skirt-side fitting groove.

16. A jet engine comprising the shield member according to claim 1.

17. A jet engine comprising the shield member according to claim 2.

18. A jet engine comprising the shield member according to claim 3.

19. A jet engine comprising the shield member according to claim 4.

20. A jet engine comprising the shield member according to claim 5.

* * * * *